US006225923B1

(12) United States Patent
Andrews

(10) Patent No.: US 6,225,923 B1
(45) Date of Patent: *May 1, 2001

(54) ENCODER ARRANGEMENT AND BIT-EXACT IDCT PROTOCOL

(75) Inventor: D. Barry Andrews, Sunnyvale, CA (US)

(73) Assignee: Netergy Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/250,891

(22) Filed: Feb. 16, 1999

Related U.S. Application Data

(63) Continuation-in-part of application No. 09/112,612, filed on Jul. 9, 1998, which is a continuation-in-part of application No. 09/064,397, filed on Apr. 22, 1998, which is a continuation-in-part of application No. 09/005,053, filed on Jan. 9, 1998, now Pat. No. 6,124,882, which is a continuation-in-part of application No. 08/908,826, filed on Aug. 8, 1997, now Pat. No. 5,790,712, which is a continuation of application No. 08/658,917, filed on May 31, 1996, now abandoned, which is a continuation of application No. 08/303,973, filed on Sep. 9, 1994, now abandoned, which is a continuation of application No. 07/838,382, filed on Feb. 19, 1992, now Pat. No. 5,379,351.

(51) Int. Cl.$^7$ .................................................. H03M 13/00

(52) U.S. Cl. ............................................ 341/94; 348/420

(58) Field of Search ................................. 341/94, 200, 50; 348/420; 382/233, 250; 708/402; 709/247

(56) References Cited

U.S. PATENT DOCUMENTS

| 5,604,502 | * | 2/1997 | Haskell et al. ................. 341/200 |
| 5,635,938 | * | 6/1997 | Komoto .......................... 341/200 |
| 5,736,944 | * | 4/1998 | Kurihara ......................... 341/50 |
| 5,872,866 | * | 2/1999 | Strongin et al. ................ 382/233 |

OTHER PUBLICATIONS

Full Draft Text of Recommendation H.263 Version 2 ("H.263+") for Decision (No date).

Overview of the ITU–T recommendation H.261 (No date).

Document Q15–D–61 from ITU Study Group 16: Solution Proposals for the H.263 IDCT Mis–Match Problem with Deblocking Filter Mode (Annex J) Described in Q15–D–41 (No date).

U.S. application No. 09/112,612, filed Jul. 8, 1998.

U.S. application No. 09/064,397, filed Apr. 22, 1998.

U.S. application No. 08/944,311, filed Oct. 6, 1997.

U.S. application No. 09/005,053, filed Jan. 9, 1998.

\* cited by examiner

*Primary Examiner*—Michael Tokar
*Assistant Examiner*—Jean Bruner Jeanglaude
(74) *Attorney, Agent, or Firm*—Crawford PLLC

(57) ABSTRACT

The encoder arrangement and bit-exact IDCT protocol provides methods and arrangements that prevent an accumulation of errors between a transmitting codec and a receiving codec. One example embodiment is directed to an arrangement for use in a first terminal for communicating representations of images with a second terminal using a communications channel on which communication has been established between the first terminal and the second terminal. The arrangement includes a processor-based decoder/encoder circuit and a bit-exact circuit. The processor-based decoder/encoder circuit is arranged to process video data using an inverse transformer loop. The bit-exact circuit prevents unacceptable accumulation of an error within the inverse transformer loop by using the inverse transformer in the loop according to a bit-exact specification between the encoder and decoder in the respective first and second terminals.

6 Claims, 3 Drawing Sheets

ENCODER ARRANGEMENT AND BIT-EXACT IDCT PROTOCOL

RELATED PATENT DOCUMENTS

This is a continuation-in-part of U.S. patent application Ser. No. 09/112,612, filed on Jul. 9, 1998, now U.S. Pat. No. 6,160,503, which is a continuation-in-part of U.S. patent application Ser. No. 09/064,397, filed on Apr. 22, 1998, which is a continuation-in-part of U.S. patent application Ser. No. 09/005,053, filed Jan. 9, 1988, (now U.S. Pat. No. 6,124,882), which is a continuation-in-part of U.S. patent application 908,826, filed on Aug. 8,1997 (now U.S. Pat. No. 5,790,712), which is a continuation of U.S. patent application Ser. No. 08/658,917, filed on May 31, 1996 (now abandoned), which is a continuation of U.S. patent application Ser. No. 303,973, filed Sep. 9, 1994 (now abandoned), which is a continuation of U.S. patent application Ser. No. 07/838,382, filed Feb. 19, 1992, now U.S. Pat. No. 5,379,351. Each of these patent documents is incorporated herein by reference in its entirety.

FIELD OF THE INVENTION

The present invention relates to data compression and decompression in an encoding/decoding system. The present invention has particular application for image coding/decoding systems where communicating terminals employ reconstruction algorithms based on previously decoded images.

BACKGROUND OF THE INVENTION

Videocommunication equipment, such as videoconferencing systems and videophone devices, have enabled people to communicate visually without having to travel to a common location. As a result, communication participants can be separated by large distances.

A typical videoconferencing uses a video camera to capture a series of images of a target, such as a meeting participant or a document. The series of images is encoded as a data stream and transmitted over a communications channel to a remote location. For example, the data stream may be transmitted over a phone line, an integrated services digital network (ISDN) line, or the Internet. The encoding process is typically implemented using a digital video coder/decoder (codec), which divides the images into blocks and compresses the blocks according to a video compression standard, such as the H.263 and H.261 recommendations by the Telecommunication Standardization Sector of the International Telecommunication Union (ITU-T). In standards of this type, a block may be compressed independent of the previous image or as a difference between the block and part of the previous image.

In a typical videoconferencing system, the data stream is received at a remote location, where it is decoded into a series of images, which may be viewed at the remote location. Depending on the equipment used, this process typically occurs at a rate of one to thirty frames per second.

In some videoconferencing applications, it is desirable to transmit a high quality still image. Until the image is completely received and decoded, the receiving terminal is often unaware of its content. Some decoders decode and display a block only after they have received the complete image. With the image being transmitted as a series of blocks, considerable delay is often involved in transmitting the entire image. For example, in applications where the available bandwidth for transmitting data is small, transmission of a 352×288 pixel image may require up to a minute. In order to transmit still images more quickly, the image may be highly compressed.

The above-mentioned Telecommunication Standardization Sector recently revised ITU-T H.263 recommendation by appending thereto Annex J: Deblocking Filter Mode. This annex describes an optional loop filter (also referred to as block edge filter or deblocking filter) to be used within the prediction loop used for coding in each of the send and receive terminals in image communicating system. The main purpose of the loop filter is to reduce blocking artifacts. Such artifacts often appear at boundaries between different image blocks. The above-mentioned annex, not unlike other recommendations by the ITU, was adopted after much research and consideration for the purpose of providing communicating image terminals of various types and manufacturers the ability to communicate images accurately.

Even without the deblocking filter problem introduced via the Annex J document, there can be divergence between local and remote terminals because of the potential for different, but Annex-A-compliant, IDCTs. To mitigate this problem, the standards require that a refresh intra-block be sent every for every transmitted set of coded blocks (for example, every 132 coded blocks). This is problematic, however, in that the bits required for a refresh block are often greater than the bits normally required to code the video data. This disadvantageous in that it requires extra bits for the transmission, and the resulting block that is viewed at the receiving terminal is unduly distorted.

SUMMARY OF THE INVENTION

In one example embodiment of the invention, a method for transmitting a representation of an image from a first terminal to a second terminal uses a communications channel on which communication has been established between the first terminal and the second terminal. The method involves encoding and decoding a representation of an image for communication in a system between the first terminal and the second terminal. The method includes: operating each of the first and second terminals using an inverse transformer loop; and preventing unacceptable accumulation of an error within the inverse transformer loop by at least one of: using the inverse transformer in the loop according to a bit-exact specification between the encoder and decoder in the respective first and second terminals; and using the inverse transformer in the loop according to one of a plurality of bit-exact specifications between the encoder and decoder in the respective first and second terminals and negotiating a common decision on the particular specification through encoder/decoder negotiation.

In another embodiment, an arrangement for similar use comprises: a processor-based decoder/encoder circuit arranged to process video data using an inverse transformer loop; and a circuit for preventing unacceptable accumulation of an error within the inverse transformer loop by at least one of: using the inverse transformer in the loop according to a bit-exact specification between the encoder and decoder in the respective first and second terminals; and using the inverse transformer in the loop according to one of a plurality of bit-exact specifications between the encoder and decoder in the respective first and second terminals and negotiating a common decision on the particular specification through encoder/decoder negotiation.

The above summary is not intended to characterize each embodiment of the present invention. Other aspects of the present invention will become apparent upon review of the figures and corresponding "Detailed Description".

BRIEF DESCRIPTION OF THE DRAWINGS

Various aspects and advantages of the present invention will become apparent upon reading the following detailed description of various embodiments and upon reference to the drawings in which.

Figure 1:
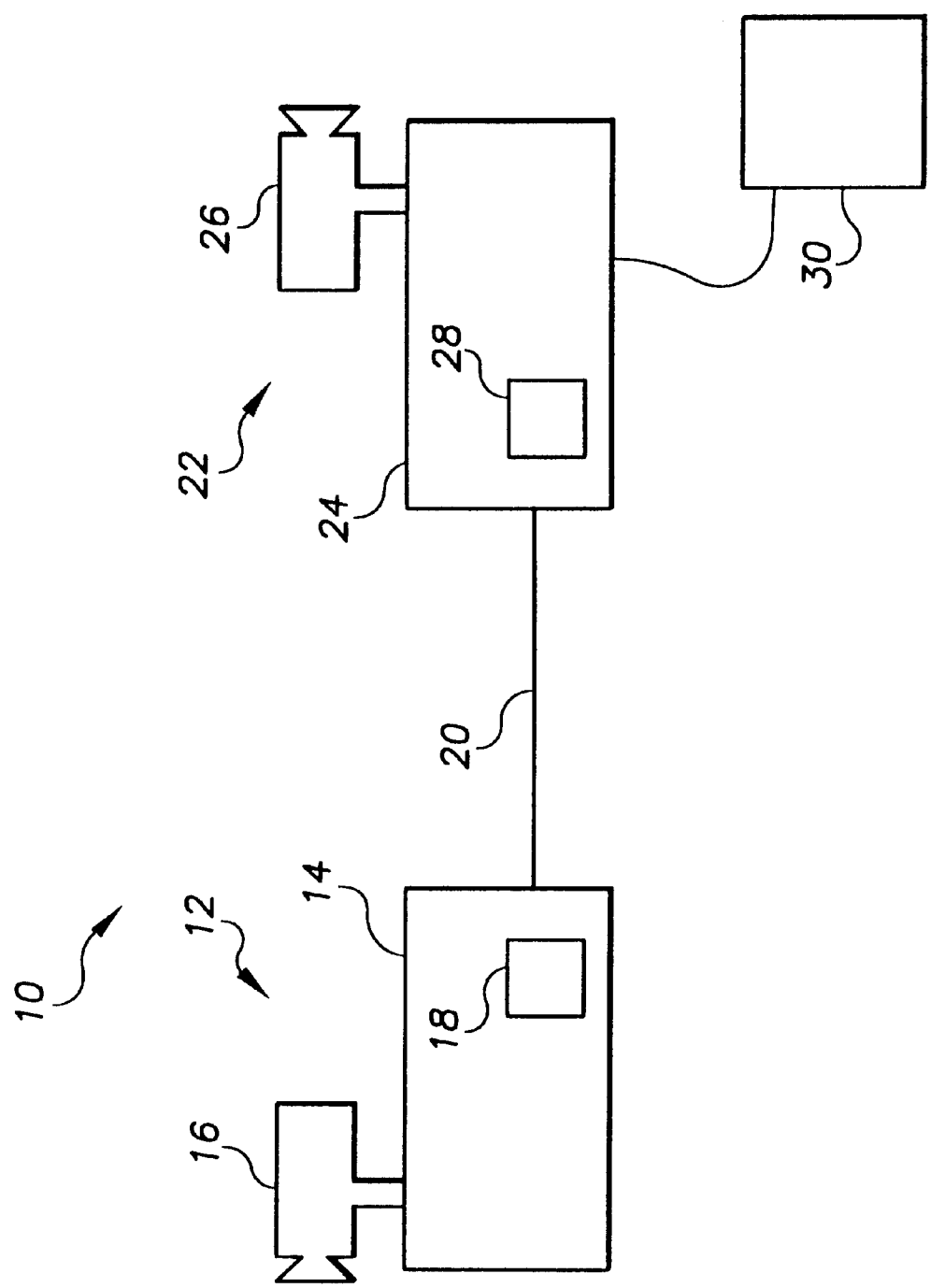
FIG. 1 illustrates a videoconferencing system implementing an example application and embodiment of the present invention.

While the invention is amenable to various modifications and alternative forms, specifics thereof have been shown by way of example in the drawings and will be described in detail. It should be understood, however, that the intention is not to limit the invention to the particular embodiment described. On the contrary, the invention is to cover all modifications, equivalents, and alternatives falling within the spirit and scope of the invention as defined by the appended claims.

DETAILED DESCRIPTION OF THE VARIOUS EXAMPLE EMBODIMENTS

The present invention is believed to be applicable to a variety of systems and arrangements that transmit and decode compressed images. The present invention has been found to be particularly advantageous in videoconferencing applications in which the reconstruction algorithms of the compressor encoder and compressor decoder may not be identical. A particular example application is an application intending to be compliant with the ITU-T H.263 but with a bit-exact or operation-specific methodology at both ends. While the present invention is not necessarily limited to such applications, an appreciation of various aspects of the invention is best gained through a discussion of example arrangements operating in this type of application.

In connection with the present invention, it has been discovered that the nature of the ITU-T H.263 recommendation permits or allows the accumulation of divergence between terminals. The standard attempts to minimize this divergence by requiring that a refreshed block be sent every 132 or so coded blocks. This decreases coding efficiency and causes potential visual degradation.

The problem can be best understood by referring to an example image-communication system, such as the videoconferencing system 10 of FIG. 1 and the other illustrated encoding and decoding arrangements.

FIG. 1 illustrates an example videoconferencing system 10 particularly suited for use in connection with the present invention. A first videoconferencing station 12 includes a first terminal 14 that receives images from a camera 16. The images are processed by a codec 18 in the terminal 14 and are transmitted over a communications channel 20. For example, the images may be transmitted over a telephone line, an ISDN line, an Internet channel, or a similar communications network. The images are then received by a second videoconferencing station 22, including a second terminal configured to be compatible with the first terminal. To facilitate the discussion below, the first and second terminals 14 and 24 are respectively referred to as local and remote terminals. It should be understood, however, that the features described can be incorporated into either or both terminals. The remote videoconferencing station 22 may further include a camera 26 and a codec 28. The remote videoconferencing station 22 receives the images over the communications channel 20 from the local videoconferencing station 12 and decodes them using the codec 28. The decoded images may be displayed on a display monitor 30. In this manner, meetings can be conducted, for example, with participants separated by long distances with all meeting participants able to see each other.

Figure 2:
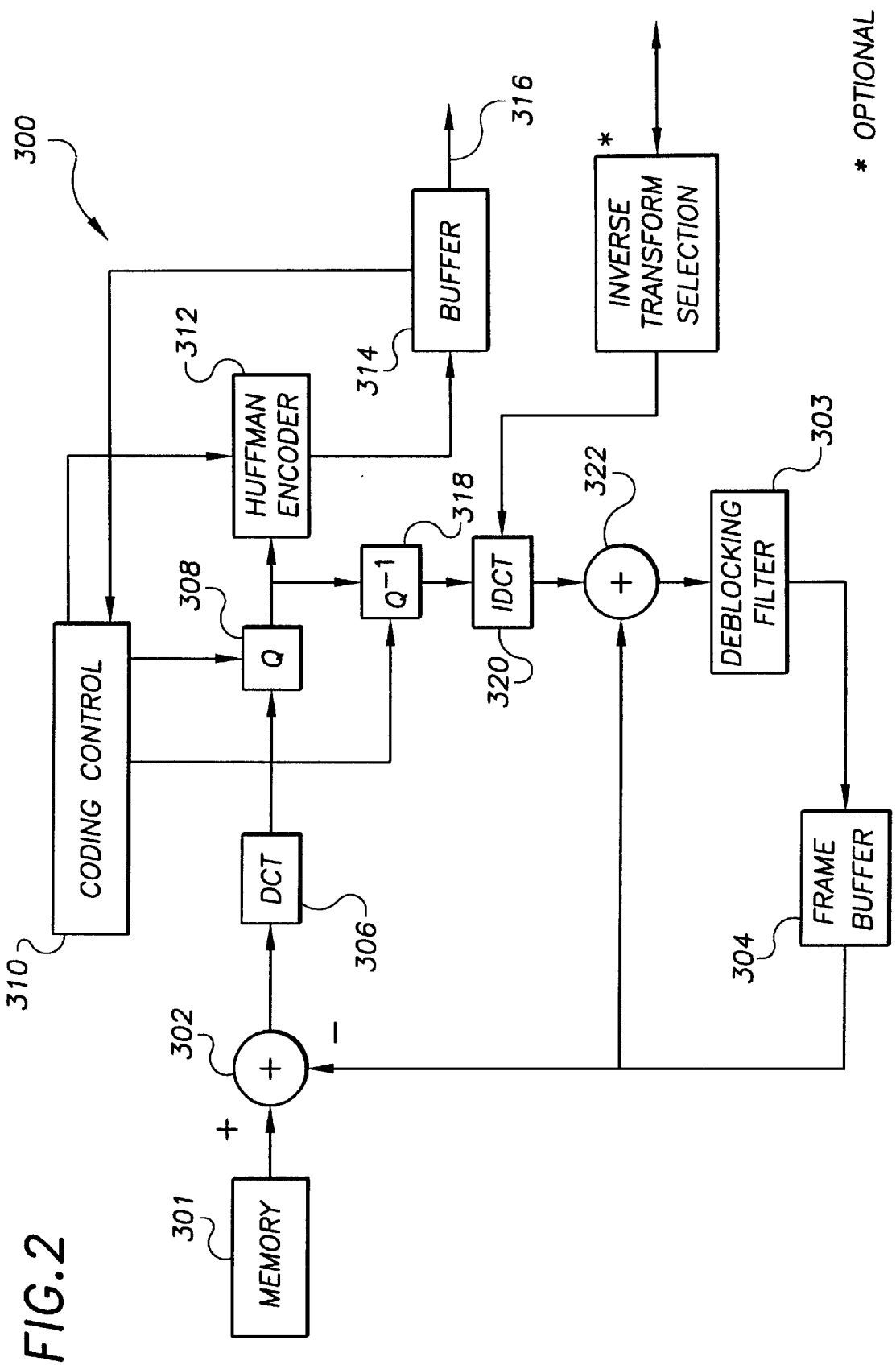
FIGS. 2 and 3 respectively illustrate an encoder arrangement and a decoder arrangement, one or both of which can be used in terminals communicating in the videoconferencing system of FIG. 1, also according to example embodiments of the present invention.

FIG. 2 illustrates another embodiment of an encoding arrangement 300 that is particularly suited for use in the present invention. An original image is stored in a memory 301, such as a frame buffer. The original image is received by a summing element 302, which is configured and arranged to calculate difference information representing the difference between the original image and an image stored in a memory 304, such as a frame buffer. When no image is initially stored in the memory 304, the original image is passed to a transformation block 306, which transforms the image into coefficient data selected from a continuous range of values. In the illustrated example, the transformation block 306 performs a discrete cosine transform (DCT) on the original image. To encode a stream of images, the original image is replaced with successive frames after encoding each frame.

The coefficient data is further transformed by a transformation block, illustrated as a quantizer 308, which is controlled by a coding control block 310. The quantizer 308 maps the coefficient data to a discrete set of values by dividing the continuous range of values into a set of non-overlapping subranges. Each subrange is mapped to a single value, such that whenever a coefficient falls within a given subrange, the quantizer 308 generates the corresponding discrete value. The size of the subranges and the quality of the quantization are controlled by the coding control block 310.

The quantized data thus generated is encoded by an encoding block, illustrated as a Huffman encoder 312. For example, the quantized data may be encoded as a run length vector. The encoded data is stored in a memory 314 for transmission over a communications channel 316.

The quantized data is also received by a transformation block 318. The transformation block 318, implemented as an inverse quantizer in the illustrated example, maps the quantized data to a continuous range of values. The quality of the inverse quantization is controlled by the coding control block 310. A second transformation block 320 further transforms the quantized data using an inverse discrete cosine transform (IDCT) to reconstruct the image as it would be seen at a remote videoconferencing station.

Using an optionally-negotiated loop filter 303 to smooth out transitions at image block boundaries, the reconstructed image is incorporated into the image previously stored in the memory 304 by a summing element 322, and the image thus produced is stored in the memory 304 as the new reference frame for encoding the next frame. The memory 304 provides the reconstructed image to the summing element 302, and the process is repeated, either by continuing to encode successive frames of video, or progressively improve a single still image.

A loop filter (as shown in both FIGS. 2 and 3) is optional and, when used, it is optionally-negotiated for use by the communicating terminals when these respective terminals negotiate to use an algorithm for the compressor encoder and compressor decoder that requires or benefits from such use. For various example embodiments of such algorithms, reference may be made to those embodiments (as discussed in the above-referenced ancestor patent documents) that employ such loop filters.

Figure 3:
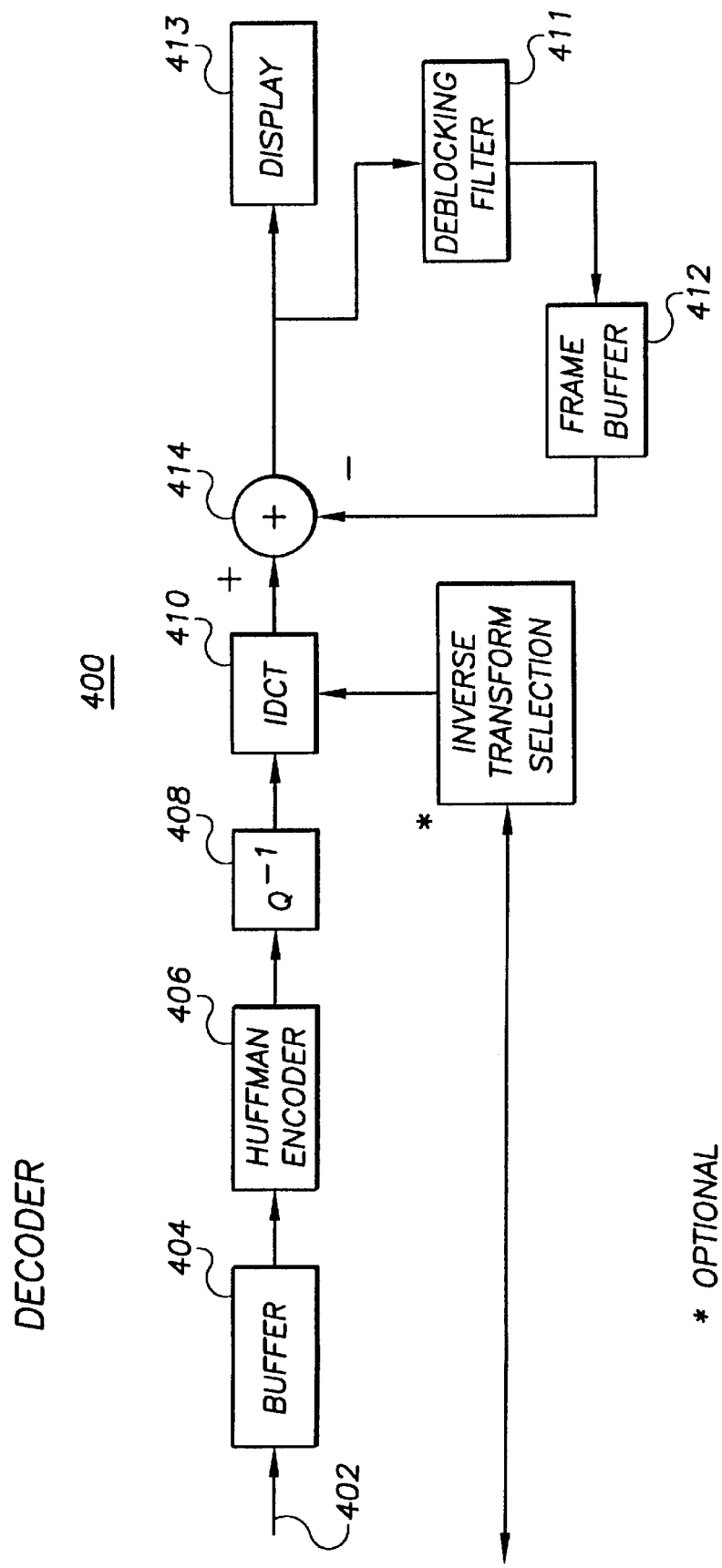

FIG. 3 illustrates another embodiment of a decoding arrangement 400, also including a loop filter like the loop filter of FIG. 2, that is optionally negotiated for use by the communications terminals as described above. A data stream received over a communications channel 402 is stored in a memory 404, implemented as a buffer in the illustrated example. A decoder, illustrated as a Huffman decoder 406, decodes the data stream into image data and provides the image data to a transformation block 408. The transformation block 408, implemented as an inverse quantizer in the illustrated example, maps the image data to a continuous range of values. A second transformation block 410 further transforms the continuous value using an inverse discrete cosine transform (IDCT) to reconstruct the difference information received from the local terminal. A summing element 414 integrates the difference information into the image previously stored in a memory 412, depicted as a frame buffer, and the image is filtered by an optimally negotiated loop filter 411 (constructed similar to the loop filter 303 of FIG. 2). The image thus produced is stored in the memory 412 and displayed by a display device 413. Additional data received over the communications channel 402 is integrated into the stored image to improve its quality.

According to one implementation, the present invention provides a method for encoding and decoding involving the use of an inverse transform that is specified bit-exactly in encoder and decoder. For example, the encoding/decoding arrangement of FIGS. 2 and 3 provide this approach, using a specified bit-exact match. This avoids encoder/decoder inverse transform mismatch, thereby eliminating divergence artifacts.

According to another implementation, the present invention provides a method for encoding and decoding involving the use of an inverse transform that is specified bit-exactly in encoder and decoder, as described above, but the inverse transform is selected at the run-time from a set of available inverse transforms. The communicating terminals then negotiate to reach a common inverse transform so that encoder/decoder inverse transforms are matched, thereby eliminating divergence artifacts and eliminating the need to refresh every 132 (or so) coded blocks, as mandated by the standard. The optional inverse transform selector of FIGS. 2 and 3 can be used to negotiate which available common inverse transform is to be used so that the algorithms are appropriately matched.

According to another implementation, an inverse transform is specified bit-exactly in the encoder and decoder of each terminal and is used as the default approach at start-up and in response to resets and other communication initiations. The particular bit-exact inverse transform is then negotiated between terminals.

Negotiation between terminals can be accomplished using any of various protocols. Using the terminals of FIG. 1, one example negotiation protocol involves preprogramming each terminal with a list of sending and receiving capabilities. The sending capabilities may be different than the receiving capabilities. For example, the capabilities of one terminal may include IDCT_spec_A, IDCT_spec_B, Annex J_deblocking filter, etc., whereas the other terminal may include each of these capabilities except for compatibility with IDCT_spec_B. Once communication is established (or concurrent with establishing communication) between the terminals, the terminal initiating the communication indicates that it will be sending the list of its capabilities, including its bit-exact algorithms. The non-initiating terminal then receives the list and responds by selecting one that is consistent with its own capabilities. According to one specific example embodiment, this selection by the non-initiating terminal is made according to a preference or priority list that is previously programmed into the terminal(s).

According to another specific example embodiment, after the non-initiating terminal receives the list it responds to the initiating terminal by sending a list of its capabilities across the communications channel. The initiating terminal then selects the algorithm according to its previously-programmed preference or priority list.

According to yet another specific example embodiment, the initiating terminal sends an inquiry to the non-initiating terminal which then sends its list to the initiating terminal by sending a list of its capabilities across the communications channel. The initiating terminal then selects the algorithm according to its previously-programmed preference or priority list. This approach is advantageous in that only one list is sent over the communication channel, and the latter two specific example embodiments are advantageous in that the initiating terminal maintains control over the selection process.

An example previously-programmed preference or priority list, as introduced in connection with the above-discussed embodiments, prioritizes the selection of a bit-exact algorithm over a non-bit-exact algorithm. For example, IDCT_spec_M (a particular algorithm listed in each terminal) is preferred over an algorithm consistent with Annex J_deblocking filter.

Accordingly, the present invention provides various implementations that solve a significant problem discovered in connection herewith. According to particular implementations, an encoding/decoding method and arrangement uses an inverse transform loop having a decoding algorithm that does not require inefficient additional refresh coding currently mandated by the applicable standard or recommendation, that is not susceptible to accumulating error due to inverse transformer mismatch, and that eliminates the possibility such error resulting in visual degradation.

For further information concerning the above-discussed approaches to bit-exact communication, reference may be made to the article attached in the filed application.

For further information concerning the construction and operation of the encoding and decoding components and blocks illustrated in connection with the figures, reference may be made to U.S. patent application Ser. No. 08/944,311, filed Oct. 6, 1997, now U.S. Pat. No. 6,075,554 and Ser. No. 09/005,053, filed Jan. 9, 1998, now U.S. Pat. No. 6,124,882 incorporated by reference in their entirety.

The various embodiments described above are provided by way of illustration only and should not be construed to limit the invention. Those skilled in the art will readily recognize various modifications and changes which may be made to the present invention without strictly following the exemplary embodiments and applications illustrated and described herein. For example, in the negotiation of the selected algorithm, it will be understood that an inquiry signal is not necessary; rather, communication can open with one of the terminals automatically sending its list of capabilities and the other terminal being programmed to recognize a unique bit sequence particular to any such list. Such changes do not depart from the true spirit and scope of the present invention which is set forth in the following claims.

What is claimed is:

1. A method for encoding and decoding a representation of an image for communication in a system between a first terminal to a second terminal, comprising:

operating each of the first and second terminals using an inverse transformer loop; and preventing unacceptable accumulation of an error within the inverse transformer loop by at least one of: using the inverse transformer in the loop according to a bit-exact specification between the encoder and decoder in the respective first and second terminals; and using the inverse transformer in the loop according to one of a plurality of bit-exact specifications between the encoder and decoder in the respective first and second terminals and negotiating a common decision on the particular specification through encoder/decoder negotiation.

2. A decoder in one of the first and second terminals, the decoder constructed and arranged to participate in the method of claim 1.

3. An encoder in one of the first and second terminals, the encoder constructed and arranged to participate in the method of claim 1.

4. A video-conferencing terminal having a decoder and an encoder that are constructed and arranged to operate according to claim 1.

5. An arrangement for transmitting a representation of an image from a first terminal to a second terminal using a communications channel on which communication has been established between the first terminal and the second terminal, comprising:

means for operating each of the first and second terminals using an inverse transformer loop; and means for preventing unacceptable accumulation of an error within the inverse transformer loop by at least one of: using the inverse transformer in the loop according to a bit-exact specification between the encoder and decoder in the respective first and second terminals; and using the inverse transformer in the loop according to one of a plurality of bit-exact specifications between the encoder and decoder in the respective first and second terminals and negotiating a common decision on the particular specification through encoder/decoder negotiation.

6. An arrangement for use in a first terminal for communicating representations of images with a second terminal using a communications channel on which communication has been established between the first terminal and the second terminal, comprising:

a processor-based decoder/encoder circuit arranged to process video data using an inverse transformer loop; and a circuit for preventing unacceptable accumulation of an error within the inverse transformer loop by at least one of: using the inverse transformer in the loop according to a bit-exact specification between the encoder and decoder in the respective first and second terminals; and using the inverse transformer in the loop according to one of a plurality of bit-exact specifications between the encoder and decoder in the respective first and second terminals and negotiating a common decision on the particular specification through encoder/decoder negotiation.

* * * * *